(12) United States Patent
Palvölgyi

(10) Patent No.: US 6,286,559 B1
(45) Date of Patent: Sep. 11, 2001

(54) FILLING PIPE FOR THE FUEL TANK OF A MOTOR VEHICLE

(75) Inventor: Sandor Palvölgyi, Gleisdorf (AT)

(73) Assignee: Tesma Motoren und Getriebetechnik Ges.m.b.H, Preding (AT)

( * ) Notice: Subject to any disclaimer, the term of this patent is extended or adjusted under 35 U.S.C. 154(b) by 0 days.

(21) Appl. No.: 09/574,898

(22) Filed: May 19, 2000

(30) Foreign Application Priority Data

May 19, 1999 (AT) .................................. 347/99 U

(51) Int. Cl.[7] .................................................. F16L 9/00
(52) U.S. Cl. ........................ 138/177; 138/178; 138/37
(58) Field of Search ..................... 138/177, 178, 138/37

(56) References Cited

U.S. PATENT DOCUMENTS

| | | | |
|---|---|---|---|
| 1,025,568 | * 5/1912 | Higgin | 138/96 R X |
| 2,731,830 | * 1/1956 | Eichenberger et al. | 138/177 X |
| 3,358,749 | * 12/1967 | Chisholm et al. | 138/113 X |
| 5,664,606 | * 9/1997 | Anderson | 138/177 X |
| 6,098,668 | * 8/2000 | Siwinski et al. | 138/177 |
| 6,125,891 | * 10/2000 | Witmer et al. | 138/177 |

* cited by examiner

Primary Examiner—Patrick Brinson
(74) Attorney, Agent, or Firm—Bachman & LaPointe, P.C.

(57) ABSTRACT

In motor vehicles with an onboard refueling vapor recovery (ORVR) system, a filling pipe with a reduced cross-section is provided. The pipe portion with reduced cross-sectional area has at least one longitudinally directed bead which gradually merges into the adjoining cylindrical regions to reduce flow resistance and prevent turbulent flow. The bead can be produced without impairing the strength of the filling pipe. When two or more beads are provided, they are preferably distributed equiangularly.

12 Claims, 2 Drawing Sheets

FILLING PIPE FOR THE FUEL TANK OF A MOTOR VEHICLE

BACKGROUND OF THE INVENTION

The invention relates to a filling pipe for a fuel tank of a motor vehicle having a fuel vapor absorbing system, wherein the filling pipe has a reduced cross section over part of its length. By fuel vapor absorbing system is meant a system which absorbs fuel vapors which are displaced out of the fuel tank during refueling and feeds them to a regenerable filter. Such a system is known by experts as an ORVR system (Onboard Refueling Vapor Recovery).

In order to carry out this recovery function properly, it must be ensured that during refueling the fuel vapors do not flow out through the filling pipe, but rather flow in their entirety through the filter. For this purpose, the fuel which flows through the filling pipe during the refueling procedure has to build up a sealing liquid column which forms a liquid seal and thereby prevents fuel vapors from escaping through the filling pipe.

According to the prior art, the liquid seal is achieved by a circular symmetrical constriction of the filling pipe over part of its length. A venturi nozzle-like effect is therefore produced. However, this liquid seal fails if a turbulent flow forms in the filling pipe, whether due to a fuel nozzle inserted crookedly or due to the Coriolis force similar to drainage from a bathtub. In case of a helical flow being produced in this manner, the liquid is pressed by the centrifugal force against the pipe wall, and in the vicinity of the longitudinal axis a space is formed which is not filled with liquid and through which fuel vapors escape to the outside. This known design also has the disadvantage that the reduction in diameter of a pipe made of metal is costly in terms of manufacturing because it is normally done by expanding the adjacent parts.

SUMMARY OF THE INVENTION

It is the principal object of the present invention to design a filling pipe wherein the formation and maintaining of a sealing liquid column are ensured under all circumstances. According to the invention, this is achieved by the filling pipe having at least one longitudinally directed bead. It is a further object to provide such a filling pipe at a low manufacturing cost.

The provision of at least one bead prevents the formation of a turbulent flow by means of an air-permeable hole in the center of the pipe. In addition the bead permits reduction of the cross section in a cost effective manner. When a bead is pressed in the pipe there is no expansion of the pipe in the circumferential direction.

Further advantages of the filling pipe of the invention are as follows: The gentle transition between the bead and the cylindrical parts of the filling pipe reduces the flow resistance. The bead can be produced without the strength of the filling pipe being reduced. When two or three beads are provided, the beneficial turbulence-preventing action can be obtained with a small depth of deformation for the bead and the beneficial action is improved.

Two advantageous embodiments consist in the beads either being pressed in from the diameter of the cylindrical parts or in them originating from a smaller diameter portion of the pipe. In the first form, no change at all to the pipe diameter is required. In the second form the change, and the press-in depth of the bead, remain small, which, in certain cases (for example, if the pipe is made of plastic) is advantageous in terms of manufacturing. The length of the beads is optimal if it amounts to two to three times the diameter of the filling pipe.

BRIEF DESCRIPTION OF THE DRAWINGS

In the following, the invention is described and explained with reference to figures, in which.

DETAILED DESCRIPTION

Figure 1:
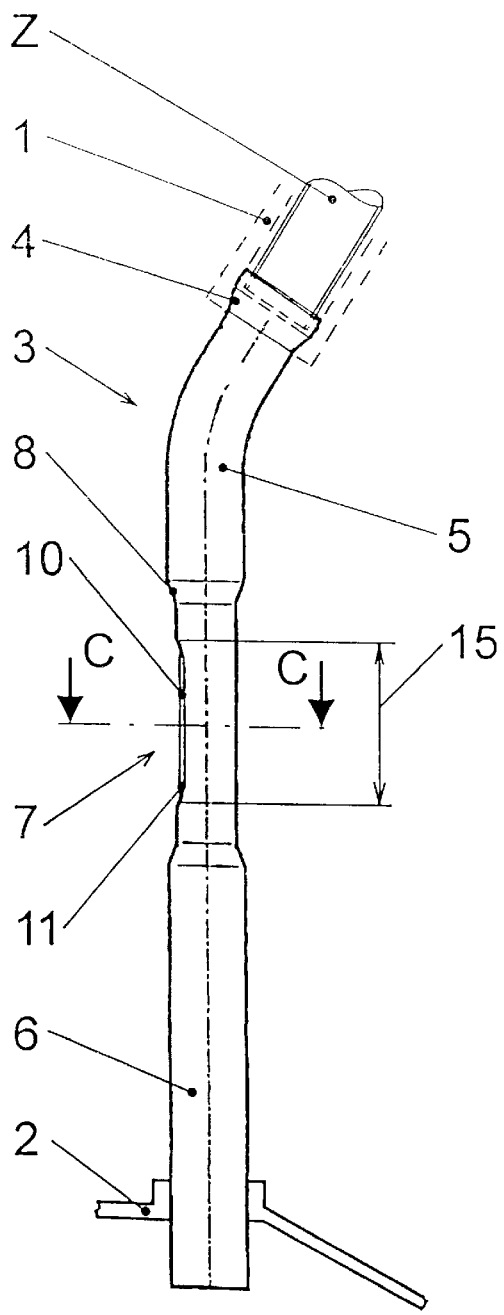
FIG. 1 shows the longitudinal section of a filling pipe according to the invention in a first embodiment.

In FIG. 1, the filler neck of a motor vehicle is indicated by dashed lines and denoted by 1. A fuel nozzle Z is inserted into said filler neck from the outside. The motor vehicle has a fuel vapor absorbing system as described above, which is not illustrated. A filling pipe, which is denoted in general by 3, extends between the filler neck 1 and a fuel tank 2 and is designed for use in conjunction with the fuel vapor absorbing system.

At its upper end, the filling pipe 3 has a bell-shaped expanded portion 4 which is connected to the filler neck 1. The filling pipe 3 comprises an upper cylindrical part 5, which may be bent, as illustrated, a lower cylindrical part 6 which is connected to the fuel tank 2 and between the two cylindrical parts 5, 6 is a central part 7 which is of smaller diameter and merges via conical expanded portions 8 into the upper and lower cylindrical parts of larger diameter. This central part 7 has at least one bead 10 which runs in the longitudinal direction and has at its upper and lower ends gentle transitions 11 into the circular cross section of the central part 7.

Figure 3:
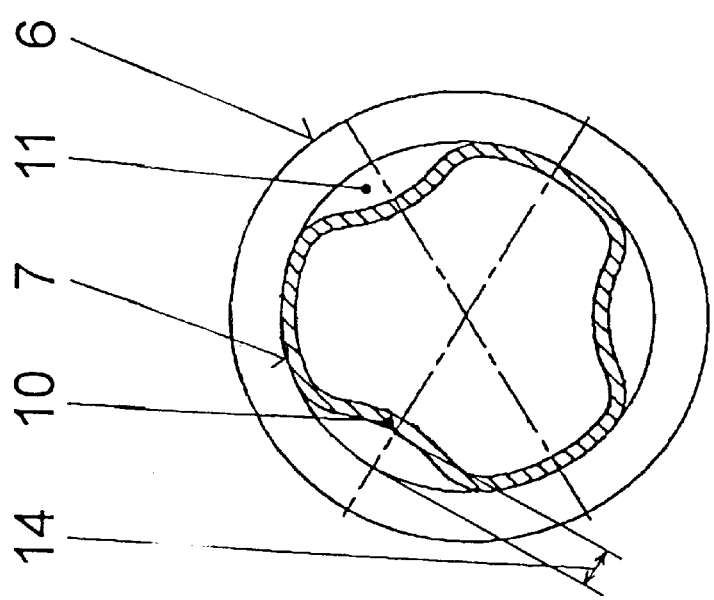
FIG. 3 shows a cross section according to CC in FIG. 1, on an enlarged scale.

FIG. 3 shows the cross section through the central part 7 with three beads 10 which are offset with respect to one another by the same angles. The width of the beads in the circumferential direction is approximately the same as the width of the part lying between the adjacent beads. The depth 14 of the beads amounts to approximately a tenth of the pipe diameter.

Figure 2:
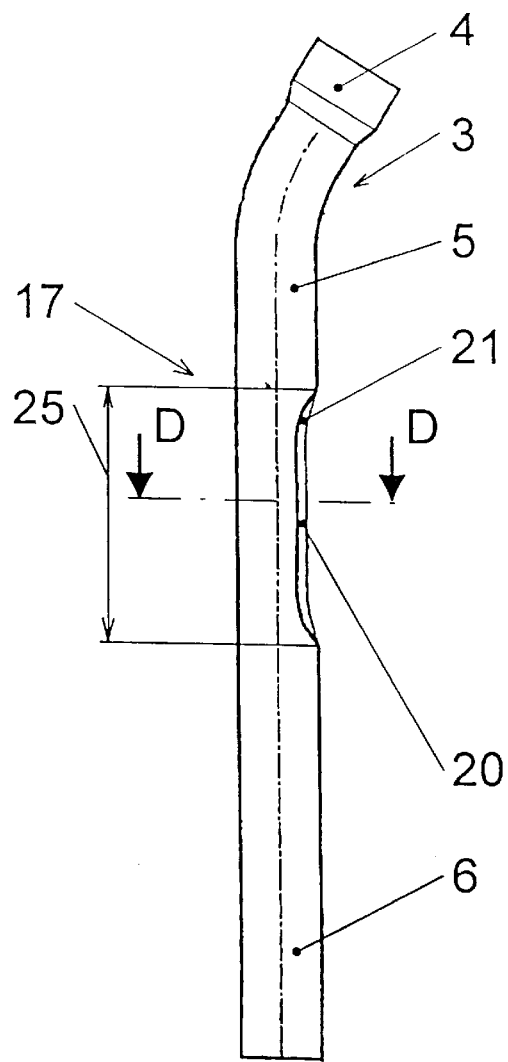
FIG. 2 shows the longitudinal section of a filling pipe according to the invention in a second embodiment.
Figure 4:
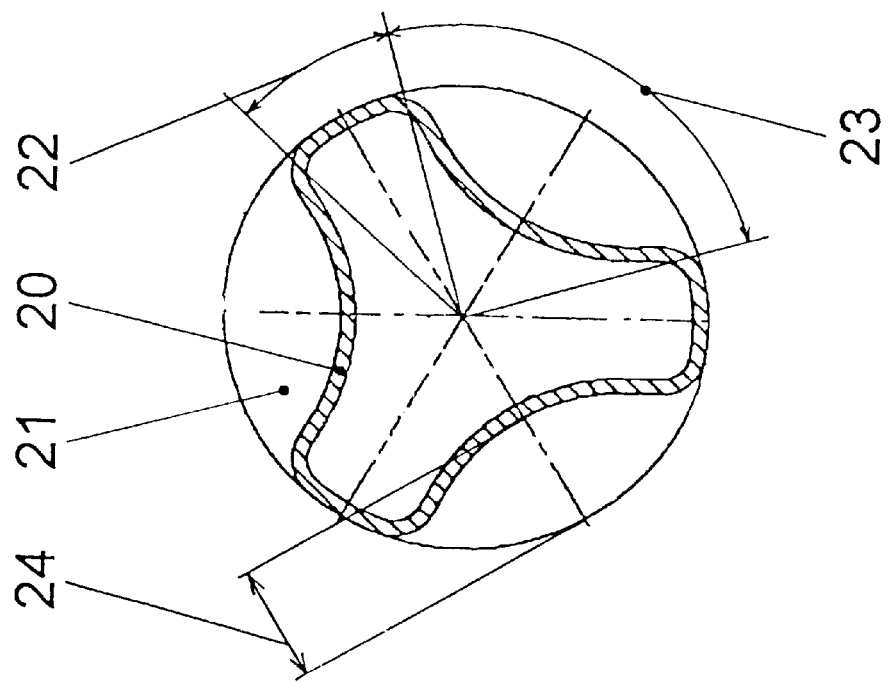
FIG. 4 shows a cross section according to DD in FIG. 2, on an enlarged scale.

The embodiment of FIGS. 2 and 4 differs from that of FIG. 1 in that the central part 17 is not constricted and the filling pipe has the same diameter over its entire length. The beads 20 are longer and deeper here and at transitions 21 also merge gently into the cylindrical part. According to FIG. 4, there are also three beads 20 whose width 23 in this embodiment equals approximately twice the circumferential parts 22 which lie in between the adjacent beads. The depth 24 amounts approximately to a quarter of the pipe diameter which is not pressed in.

These beads prevent the buildup of a turbulent flow in the filling pipe and therefore reliably ensure the sealing function of the fuel flowing through. In addition, the beads can be manufactured easily starting from a cylindrical pipe made of metal or plastic.

What is claimed is:

1. A filling pipe having a longitudinal axis comprising a first part having a first cross section a second part, having a second cross section and a central portion between the first part and the second part, the central portion having a reduced cross section portion which is smaller than the first and second cross sections, wherein the reduced cross section is formed by an at least one longitudinally extending bead.

2. The filling pipe as claimed in claim 1, wherein at least one of the first part and second part has a substantially cylindrical sidewall and the at least one bead merges into the substantially cylindrical sidewall by means of a transition portion.

3. The filling pipe as claimed in claim 1, wherein at least two beads are provided which are distributed equiangularly over the circumference of the central portion of the filling pipe.

4. The filling pipe as claimed in claim 2, wherein the at least one bead is directed inward toward the longitudinal axis of the filling pipe.

5. The filling pipe as claimed in claim 8, wherein the reduced cross section portion has a smaller diameter portion wherein the at least one bead is located in the smaller diameter portion.

6. The filling pipe as claimed in claim 2, wherein the length of at least one of the beads is two to three times the diameter of the portion of the filling pipe which is provided with the bead.

7. In combination, a fuel tank in a motor vehicle and a filling pipe for said fuel tank in a motor vehicle, the filling pipe having a portion of reduced cross section, wherein the reduced cross section is formed by an at least one longitudinally extending bead.

8. The combination as claimed in claim 7, wherein the filling pipe has a substantially cylindrical sidewall and the at least one bead merges into the cylindrical sidewall of the filling pipe by means of a transition portion.

9. The combination as claimed in claim 7, wherein at least two beads are provided which are distributed equiangularly over the circumference of the filling pipe.

10. The combination as claimed in claim 8, wherein the at least one bead is directed inward toward the longitudinal axis of the filling pipe.

11. The combination as claimed in claim 8, wherein the filling pipe has a smaller diameter portion wherein the at least one bead is located in the smaller diameter portion.

12. The combination as claimed in claim 8, wherein the length of at least one of the beads is two to three times the diameter of the portion of the filling pipe which is provided with the bead.

* * * * *